United States Patent [19]
Virgil et al.

[11] Patent Number: 5,493,679
[45] Date of Patent: Feb. 20, 1996

[54] AUTOMATED LOGISTICAL RELATIONAL DATABASE SUPPORT SYSTEM FOR ENGINEERING DRAWINGS AND ARTWORK

[75] Inventors: Kenneth W. Virgil; Anthony F. Zucco; Walter R. Harker; Roger L. Brown; James P. Merriman; Albert D. Baron; Philip J. June, all of Tucson, Ariz.

[73] Assignee: Hughes Aircraft Company, Los Angeles, Calif.

[21] Appl. No.: 146,279

[22] Filed: Oct. 29, 1993

[51] Int. Cl.$^6$ .................................................. G06F 17/30
[52] U.S. Cl. .................... 395/600; 395/919; 364/DIG. 1; 364/282.1; 364/283.4; 364/283.3
[58] Field of Search .................................. 395/600, 148, 395/919; 364/486, 489

[56] References Cited

U.S. PATENT DOCUMENTS

| | | | |
|---|---|---|---|
| 4,862,376 | 8/1989 | Ferriter et al. | 364/468 |
| 4,964,060 | 10/1990 | Hartsog | 364/512 |
| 5,201,046 | 4/1993 | Goldberg et al. | 395/600 |
| 5,295,261 | 3/1994 | Simonetti | 395/600 |
| 5,339,247 | 8/1994 | Kirihara et al. | 364/468 |
| 5,341,469 | 8/1994 | Rossberg et al. | 395/145 |
| 5,428,727 | 6/1995 | Kurosu et al. | 395/147 |

OTHER PUBLICATIONS

Omura, Mastering AutoCAD, SYBEX, Inc., © 1987, pp. 27, 184–189, 291–293.

*Primary Examiner*—Thomas G. Black
*Assistant Examiner*—Wayne Amsbury
*Attorney, Agent, or Firm*—Charles D. Brown; Randall M. Heald; Wanda K. Denson-Low

[57] ABSTRACT

A process for establishing a relationship between the Logistics Support Analysis Record (LSAR) database and a released engineering drawing database. The process includes establishing several database pointer tables for relating the drawings to appropriate end items, task and subtasks. As a result of the process, Logistics Support Analysis functions can be performed in less time, for less cost and with fewer errors. The query aspects of the LSAR database can be used to relate specific hardware to its maintenance procedures, special tool requirements and special handling equipment. Source engineering documents are related to publications art, and engineering drawings are related to task/subtask. The process facilitates automated change notification procedures.

11 Claims, 5 Drawing Sheets

RELATIONSHIP CARDINALITIES

─╫─ ONE AND ONLY ONE

─╤─ ONE OR MORE

─○┤─ NONE OR ONE

─○╤─ NONE, OR ONE MORE

AUTOMATED LOGISTICAL RELATIONAL DATABASE SUPPORT SYSTEM FOR ENGINEERING DRAWINGS AND ARTWORK

BACKGROUND OF THE INVENTION

The present invention relates to an automated logistics process, whereby a computerized relationship is established between the Logistics Support Analysis Record (LSAR) database and the released engineering drawing database.

The Department of Defense (DoD) publishes Military Standards ("MIL-STDs") as a means of standardizing the way, means, and manner of doing business. When doing business with DoD, any MIL-STDs referring to that type of business must be adhered to.

The U.S. government has established a relational database containing information relating to various military logistical matters. This is known as the MIL-STD-1388-2B Logistical Support Analysis Record (LSAR) database. MIL-STD-1388-2B establishes a standard medium to systematically record, store, process and report data gathered during the logistics and engineering front-end analysis process. This data is required by the elements of support to develop their logistics supportability products. The MIL-STD defines a file format which permits orderly and cost-effective input, storage, analysis, and retrieval of logistical support analysis (LSA) data and LSA-related information.

Vendors who wish to provide computer tracking of their products are required to comply with MIL-STD-1388-2B in the construction of their databases. Conventionally, these databases have been used as repositories for engineering notes for particular products and services. Thus, for example, a vendor of an airborne missile may provide a database in which are stored various engineering notes regarding the maintenance, installation and removal procedures for handling and maintaining the missile.

The U.S. government typically requires vendors to provide standard technical publications and other logistic documents in support of Department of Defense products, including Technical Publications, Technical Manuals and the like. Such documents are typically required to comply with particular military standards, such as MIL-M-38784 and MIL-M-81927. MIL-M-38784 is the most commonly used general style and format requirement for preparation of manuscripts and reproducible copy for standard technical manuals and changes thereto. MIL-M-81927 is the general style and format requirement for the preparation of technical manuals to the Work Package (WP) concept. The WP manual is specifically designed to respond to work tasks, i.e., the complete set of instructions and pertinent information for a given work task is assembled into a single stand-alone work package. The useability of a WP is the result of applying logical organization to improve access to technical information.

Presently, the Responsible Support Engineer (RSE) researches the engineering to perform Logistics Support Analysis functions (LSA). The identified engineering is often documented in personal files (if documented at all), and these files are often misplaced, misfiled, or simply lost. This research is often duplicated by other RSEs. A centralized repository for this information does not currently exist and the current process is not computerized; it is manual and labor intensive.

SUMMARY OF THE INVENTION

A method is described for storing engineering drawings and artwork in a relational database for subsequent retrieval and use. The method comprises the following steps:

creating one or more engineering drawings of a given part on a computer aided design (CAD) system, and storing these drawings in memory in a drawing CAD file;

using the stored engineering drawings to prepare artwork regarding the part on the CAD system and storing the artwork in memory in an artwork CAD file;

transforming the drawing CAD file and the artwork CAD file into a digital data graphics drawing file and a digital data graphics artwork file, wherein the format of the digital data graphics files is specified by requirements of the database;

transferring the graphics drawing file and the graphics artwork file to database memory;

preparing control files specifying control data regarding the stored engineering drawings and the artwork to be added to files comprising the database; and adding the control data to pointer tables comprising the database, the control data specifying a relationship between the artwork and a corresponding engineering drawing.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

The purpose of this invention is to provide a complete relationship between the LSAR database set up by the government and engineering documentation, particularly engineering drawings and artwork produced from such drawings.

For purposes of this application, "drawing" refers to an "engineering drawing." Some engineering drawings contain a two or three dimensional drawing or representation of a particular piece of hardware containing all dimensions (length, width, height) of the hardware. Some engineering drawings also include a complete list of parts required, with quantity, to make or manufacture this piece of hardware. Additionally, there may be embedded intelligence in the engineering drawings, that allow for them to be sent digitally to a Numerical Control machine that will manufacture the piece of hardware. Other engineering drawings only exist on paper as they were drawn by hand at a drafting table. The term "artwork" refers to a piece of art or illustration generated specifically for a technical publication. Most artwork is generated from a copy of an existing drawing(s), and so there is a relationship between the source drawing(s) and the finished artwork. The generation of artwork is performed electronically via a computer-aided drawing (CAD) system.

Figure 1:
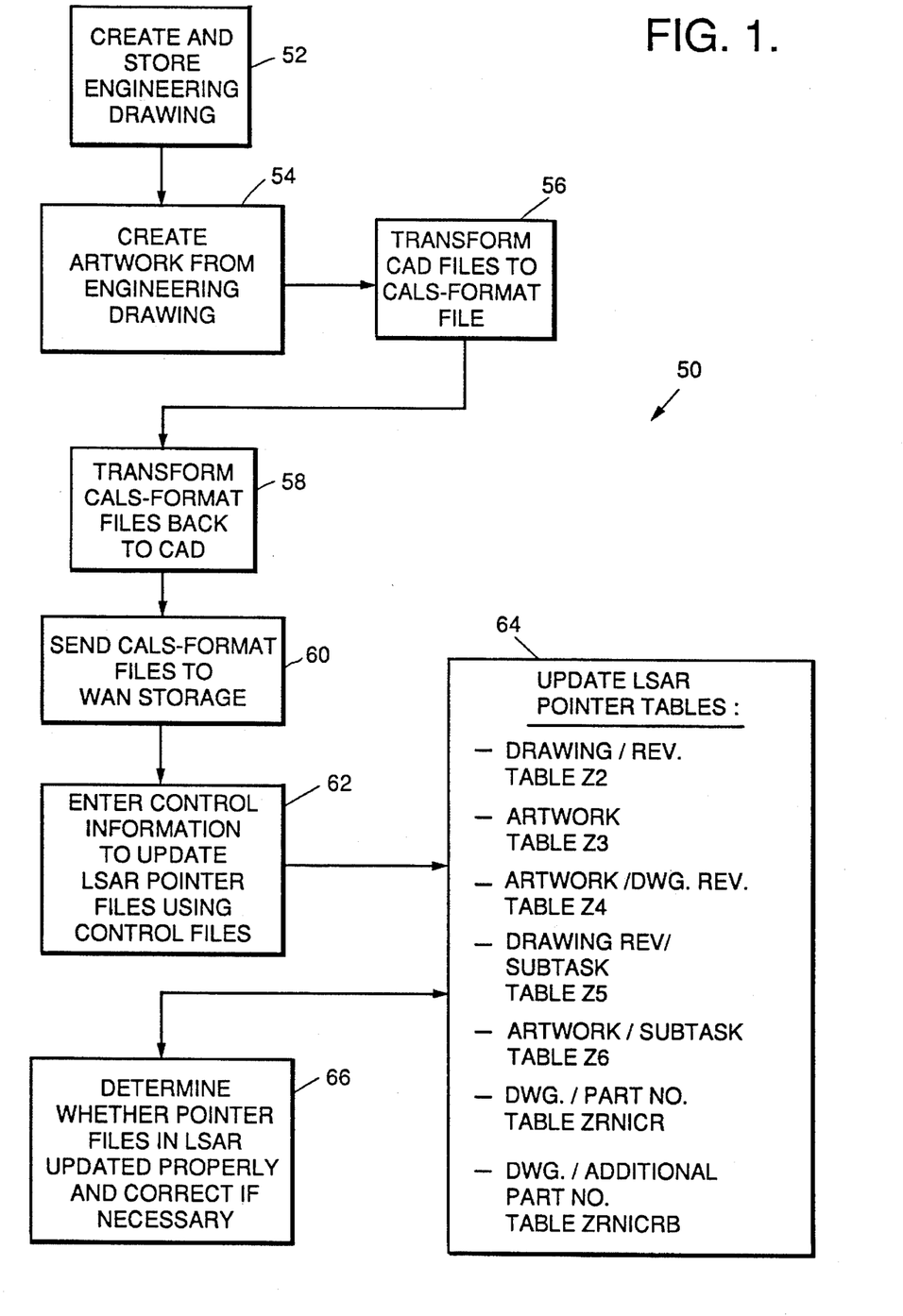
FIG. 1 is a simplified block diagram illustrative of the process of this invention.

FIG. 1 is a simplified block diagram illustrative of a relational process 50 in accordance with this invention. The engineering drawings are created in the conventional manner on a CAD system, and copies are saved in CAD system memory at step 52. It is noted that this memory is typically not accessible to the LSAR database. Next, at step 54, artwork is created on the CAD system in the conventional manner from the engineering drawing which has been stored in memory. Conventionally, the artwork would not be entered formally into the engineering drawing system, but instead would be documented in artist personal files and the like.

Industry trends indicate that paper deliveries of technical manuals, artwork and engineering drawings to the Department of Defense (DoD) will ultimately be replaced by electronic deliveries under the requirements of the DoD computer-aided acquisition and logistic support (CALS) initiative, which specify several CALS digital data formats. One such CALS format is known as "initial graphics exchange specification" (IGES); another CALS format is known as computer Meta File ("CGM") per MIL-STD MIL-C-8001. While the embodiment of the invention described herein employs the IGES format other data formats may be employed as well. The CGM format has the advantage of requiring less memory space than IGES. In order to meet this eventual requirement, the CAD file containing the artwork is converted to an IGES file by an IGES translator (step 56). Such translators are known in the art.

DOD regulations do not require that IGES translation processes translate 100% of the drawing or artwork information from the CAD file into the IGES file; presently the requirement is that 75% of the information must be translated. In order to check on the quality of the CAD-IGES translation, the IGES file is translated back to the CAD environment to permit the comparison of the original CAD artwork and the translated CAD artwork. If the comparison indicates that the translation process produces an acceptable product, the IGES file is sent to storage in an WAN system environment, typically on a disk drive. "WAN" represents "wide area network" operating system, used for the LSAR database.

In accordance with the invention, pointer information regarding the new artwork or engineering drawing, as well as an image of the artwork or engineering drawing, is entered in the LSAR database, by use of control files. Thus, in step 62, control information is entered in the control files 62 specifying the data to be added to the LSAR database files. At step 64 the data is entered in the LSAR pointer tables. A test is performed to determine whether the pointer data was updated properly, and corrective measures are undertaken if the data did not get updated in the LSAR tables as desired. Such corrective measures include deleting the invalid pointer, correcting or modifying the control information and performing the process again.

The LSAR database already includes a number of tables used in this invention. It includes the XA table, specifying the end item, table XB, specifying the LCN identification item, table CA, identifying the task, table CB, identifying the subtasks, table CC, containing the subtask descriptions, table HA, containing item identification, and table HB, containing additional reference numbers. In accordance with the invention, several new tables are added to the LSAR database, specifically the Z2, ZRNICR, ZNRICRB, Z3, Z4, Z5 and Z6 tables, referred to hereinafter as the "Drawing Tables."

The Drawing Tables not only record the relationships between the artwork and engineering drawings with the 1388-2B Military Standard but also serve as a repository for them once they have been converted to CCITT Group 4 (per MIL-R-28002) compressed image, Computer Graphics Meta File (per MIL-STD MIL-C-28001) or IGES (Initial Graphic Exchange Specification as defined in MIL-D-28000) in compliance with the Department of Defenses CALS initiatives. Essentially, artwork is stored as IGES, and engineering drawings are stored as CCITT Group 4 or raster images.

| Table Code | Table Title |
| --- | --- |
| Z2 | Drawing Repository |
| ZRNICR | Reference Number/Drawing Number Cross Reference |
| ZRNICRB | Additional Reference Number/Drawing Number Cross Reference |
| Z3 | Publication Artwork |
| Z4 | Drawing/Artwork Cross Reference |
| Z5 | Drawing/Subtask Cross Reference |
| Z6 | Artwork/Subtask Cross Reference |

Table Z2 is the engineering drawing repository, and contains the CCITT Group 4 image of the engineering drawing. Each drawing is identified by both a unique drawing identifier and, if required, a drawing revision identifier. Additionally, each drawing may consist of one or more sheets due to the size or complexity of the drawing. Sheets are the physical dimensions of the paper when the drawing is printed on paper.

These sheets are stored as tiles. A tile is defined as 'A rectangular region in a layout object in which all such regions have the same dimensions, no part of any region overlaps any other region, and regions are positioned in a fixed grid, determined by partitioning the layout object into region-sized areas.' The number of tiles making up the released engineering drawing, plus one for the overview, depends upon the Sheet Size Code. The following rule applies:

| Sheet Size Code | Number of Tiles |
| --- | --- |
| A | 2 |
| B | 5 |
| C | 5 |
| D | 9 |
| E | 17 |
| J | 49 |

Each of these columns, the drawing identifier, the drawing identifier revision, the sheet size code, and the tile number is identified as a key, thus ensuring uniqueness and preventing duplicate entries. Each column is identified as a key, thus ensuring uniqueness and preventing duplicate entries. A "key" in this sense is a particular field or combination of fields in a data record upon which some "lookup" or ordering process is performed. Other fields in the record could be considered ancillary to the key during such a process. The primary keys are: Drawing Number (DWGNUMZ2); Drawing Number Revision (DWGNRVZ2); Drawing Sheet Number (DWGSHNZ2); and Drawing Sheet Tile Number (DWGTLNZ2).

The Data Element Definition (DED) numbers in a table column herein define the column. DED numbers with a "Z"

prefix have been specially created; DED numbers without the prefix are those in the MIL-STD 1388-2B database. Appendix I sets forth a specification of exemplary DEDs employed in a particular embodiment of the application.

TABLE Z2

| Code | Data Element Title | Format | DED | KEY |
|---|---|---|---|---|
| DWGNUMZ2 | Drawing Number | 32 X L | Z001 | K |
| DWGNRVZ2 | Drawing number Revision | 3 A L | Z003 | K |
| DWGSHNZ2 | Drawing Sheet Number | 2 N F | Z002 | K |
| DWGTLNZ2 | Drawing Sheet Tile Number | 2 N F | Z007 | K |
| DWGSIZZ2 | Drawing Sheet Size | 1 A F | Z006 | |
| DWGTYPZ2 | Drawing Type | 1 A F | Z004 | |
| DWGMGZ2 | Drawing Image | Image | Z005 | |

Table ZRNICR is the Reference Number/Drawing Number Cross Reference Table. Table ZRNICR provides a cross reference between the drawing and the part number stored in the HA Table of the LSAR database; the drawing is cross referenced to the Commercial and Government Entity (CAGE) Code and Reference Number. (The CAGE code is assigned by the government to uniquely identify an organization. The reference number is the manufacturer's part number. The CAGE Code and Reference Number uniquely identify a part.) The Table keys include: Cage Code (CAGECDXH); Reference Number (REFNUMHA); Drawing Number (DWGNUMZ2); and Drawing Number Revision (DWGNUMZ2). The foreign keys CAGECDXH and REFNUMHA are foreign to Table HA, and foreign keys DWGNUMZ2 and DWGNRVZ2 are foreign to Table Z2. Table HA is the MIL-STD 1388-2B Item Identification Table. This table contains parts information that is independent of the part's application. Item identification, cataloging, common maintenance information, special management characteristics and units of measure and issue are recorded in Table HA. Each engineering drawing is a representation of a part. But the drawing number and part number are different. Table ZRNICR identifies which part number is represented by which drawing number.

TABLE ZRNICR

| Code | Data Element Title | Format | DED | KEY |
|---|---|---|---|---|
| CAGECDXH | Cage Code | 5 X F | 46 | F |
| REFNUMHA | Reference Number | 32 X L | 337 | F |
| DWGNUMZ2 | Drawing Number | 32 X L | Z001 | F |
| DWGNRVZ2 | Drawing Number Revision | 2 A L | Z003 | F |

Table ZRNICRB. Additional Reference Number/Drawing Number Cross Reference Table. Table ZRNICRB provides a cross reference between the drawing and the additional part number stored in the HB Table of the LSAR database. The HB Table, "Additional Reference Number," is a MIL-STD 13882B table, which contains additional reference numbers that may be used to identify the item of supply. In some instances, two different vendors will manufacture the same part. The part will have different CAGE Codes and Part Numbers but the same physical characteristics. Thus, there is no need to store the same information in Table HA twice, but rather store a cross reference of such parts. This is the purpose of Table HB. Even though the parts are the same with separate and unique CAGE codes and Reference Numbers, there will be separate engineering drawings. As Table ZRNICR relates part numbers (reference numbers) to drawings, Table ZRNICRB relates additional reference numbers to drawings. The drawing is cross referenced to the ARN Item Cage Code, ARN Item Reference Number, Additional Cage Code and Additional Reference Number in Table HB. Table keys include: ARN Item Cage Code (CAGECDHB); ARN Item Reference Number (REFNUMHB); ARN Cage Code; Additional Reference Number; Drawing Number (DWGNUMZ2); and Drawing Number Revision (DWGNRVZ2).

The foreign keys CAGECDHB, REFNUMHB, ADCAGEHB, ADDREFHB are foreign to Table HB and foreign keys DWGNUMZ2, and DWGNRVZ2 are foreign to Table Z2.

TABLE ZRNICRB

| Code | Data Element Title | Format | DED | KEY |
|---|---|---|---|---|
| CAGECDHB | ARN Item Cage Code | 5 X F | 46 | F |
| REFNUMHB | ARN Item Reference Number | 32 X L | 337 | F |
| ADCAGEHB | ARN Cage Code | 5 X F | 46 | F |
| ADDREFHB | Additional Reference Number | 32 X L | 337 | F |
| DWGNUMZ2 | Drawing Number | 32 X L | Z001 | F |
| DWGNRVZ2 | Drawing Number Revision | 2 A L | Z003 | F |

Table Z3 is the artwork table, and contains the artwork. The primary Key is the Artwork ID Number (ARTWORK_ID). This table relates the artwork identification (ARTWORK_ID) and the subtask pointers. A task denotes specific maintenance, operator or support functions necessary to the operation and maintenance of an item. Each task has a certain number of subtasks assigned, the number varying upon the complexity of the task. A subtask is an activity (perception, decisions, and responses) which fulfills a portion of the immediate purpose within a task. An example of a task would be to remove a missile from a missile launcher. The subtasks required to perform this task could be: 1) ensure personnel are grounded to prevent electro-static discharge, 2) disarm the warhead, 3) disconnect the umbilical cord, and so forth until the missile has been completely removed from the launcher.

Table Z3 permits a particular piece of artwork to be accessed as a separate whole entity, rather than as many rows in a relational table. A second benefit of this table is that it contains a file name that can be easily processed by an archiving utility to automatically file artwork to tape for long-term retention.

TABLE Z3

| Code | Data Element Title | Format | DED | KEY |
|---|---|---|---|---|
| ARTWORK_ID | Artwork ID Number | 40 X L | Z008 | |
| ARTWORK_TYPE_CD | Artwork Type Code | 8 X L | Z009 | |
| ARTWORK_NAME | Artwork Name | 40 X L | Z010 | |
| ARTWORK_IMAGE | Artwork Image | Image | Z011 | |

Table Z4. Artwork/Drawing Cross Reference. Table Z4 is the artwork drawing revision pointer table. This table provides a cross reference of Artwork to Engineering drawing, or Engineering drawing to Artwork, depending on what is being searched for. The table contains the key fields from tables Z2 and Z3. This table is to reference a piece of art with the drawing that was used as a basis for creating the artwork.

The keys are all foreign keys and consist of the Artwork Id (ARTWORK_ID), Drawing Number (DWGNUMZ2) and the Drawing Number Revision (DWGNRVZ2). ARTWORK_ID is foreign to Table Z3, while DWGNUMZ2 and DWGNRVZ2 are foreign to Table Z2.

TABLE Z4

| Code | Data Element Title | Format | DED | KEY |
|---|---|---|---|---|
| ARTWORK_ID | Artwork Id Number | 40 X L | Z008 | F |
| DWGNUMZ2 | Drawing Number | 32 X L | Z001 | F |
| DWGNRVZ2 | Drawing Number Revision | 3 A L | Z007 | F |

Table Z5. Drawing/Subtask Cross Reference. This table is used to reference a drawing with to a subtask narrative. The engineering drawings need to be related to specific LSAR elements including task/subtask, end-item acronym code (EIACODXA), and the like. This relationship is established with the pointers stored in the Z5 table. The keys are all foreign keys. EIACODXA, LSACONXB, ALTLCNXB, LCNTYPXB, TASKCDCA, migrate from Table CB, while DWGNUMZ2 and DWGNRVZ2, migrate from Table Z2.

TABLE Z5

| Code | Data Element Title | Format | DED | KEY |
|---|---|---|---|---|
| EIACODXA | End Item Acronym Code | 10 N F | 96 | F |
| LSACONXB | LSA Control Number | 18 X F | 199 | F |
| ALTLCNXB | Alternate LCN | 2 N F | 19 | F |
| LCNTYPXB | LCN Type | 1 A F | 203 | F |
| TASKCDCA | Task Code | 7 X F | 427 | F |
| SUBNUMCB | Subtask Number | 3 N F | 407 | F |
| DWGNUMZ2 | Drawing Number | 32 X L | Z001 | F |
| DWGNRVZ2 | Drawing Number Revision | 3 A L | Z007 | F |

Table Z6. Artwork/Subtask Cross Reference. This table is used to reference a piece of artwork to a subtask narrative. Table Z6 is identical in design and purpose as Table Z5, except that it is concerned with artwork instead of engineering drawings.

TABLE Z6

| Code | Data Element Title | Format | DED | KEY |
|---|---|---|---|---|
| EIACODXA | End Item Acronym Code | 10 N F | 96 | F |
| LSACONXB | LSA Control Number | 18 X F | 199 | F |
| ALTLCNXB | Alternate LCN | 2 N F | 19 | F |
| LCNTYPXB | LCN Type | 1 A F | 203 | F |
| TASKCDCA | Task Code | 7 X F | 427 | F |
| SUBNUMCB | Subtask Number | 3 N F | 407 | F |
| DWGNUMZ2 | Drawing Number | 32 X L | Z001 | F |
| DWGNRVZ2 | Drawing Number Revision | 3 A L | Z007 | F |

Table I defines the various tables Z2–Z6.

TABLE I

| COLUMN NUMBER | COLUMN NAME | COLUMN TYPE | COLUMN LENGTH |
|---|---|---|---|
| Table Name: Z2 ||||
| Description: Drawing/Drawing Revision ||||
| 1 | DWG-ID | CHAR | 16 |
| 2 | DWG-REV-ID | CHAR | 3 |
| Table Name: Z3 ||||
| Description: Artwork ||||
| 1 | ARTWORK-ID | CHAR | 40 |
| 2 | ARTWORK-TYPE-CD | CHAR | 8 |
| 3 | ARTWORK-DSN-DESC | VARCHAR | 44 |
| 4 | ARTWORK-NAME | CHAR | 40 |
| Table Name: Z4 ||||
| Description: Artwork/Drawing Revision ||||
| 1 | ARTWORK-ID | CHAR | 40 |
| 2 | DWG-ID | CHAR | 16 |
| 3 | DWG-REV-ID | CHAR | 3 |
| Table Name: Z5 ||||
| Description: Drawing Revision/Subtask ||||
| 1 | EIACODXA | CHAR | 10 |
| 2 | LSACONXB | CHAR | 18 |
| 3 | ALTLCNXB | SMALLINT | 2 |
| 4 | LCNTYPXB | CHAR | 1 |
| 5 | TASKCDCA | CHAR | 7 |
| 6 | SUBNUMCB | DECIMAL | 3 |
| 7 | DWG-ID | CHAR | 16 |
| 8 | DWG-REV-ID | CHAR | 3 |
| Table Name: Z6 ||||
| Description: Artwork Revision/Subtask ||||
| 1 | EIACODXA | CHAR | 10 |
| 2 | LSACONXB | CHAR | 18 |
| 3 | ALTLCNXB | SMALLINT | 2 |
| 4 | LCNTYPXB | CHAR | 1 |
| 5 | TASKCDCA | CHAR | 7 |
| 6 | SUBNUMCB | DECIMAL | 3 |
| 7 | ARTWORK-ID | CHAR | 40 |
| 8 | ARTWORK-REV-ID | CHAR | 3 |
| Table Name: ZRNICR ||||
| Description: Reference Number/Drawing Number Cross Reference ||||
| 1 | CAGEDXH | CHAR | 5 |
| 2 | REFNUMHA | CHAR | 32 |
| 3 | DWGNUMZ2 | CHAR | 32 |
| 4 | DWGNRVZ2 | CHAR | 2 |
| Table Name: ZRNICRB ||||
| Description: Additional Reference Number/Drawing Number Cross Reference. ||||
| 1 | CAGECDHB | CHAR | 5 |
| 2 | REFNUMHB | CHAR | 32 |
| 3 | ADCAGEHB | CHAR | 5 |
| 4 | ADDREFHB | CHAR | 32 |
| 5 | DWGNUMZ2 | CHAR | 32 |
| 6 | DWGNRVZ2 | CHAR | 2 |

Figure 2A:
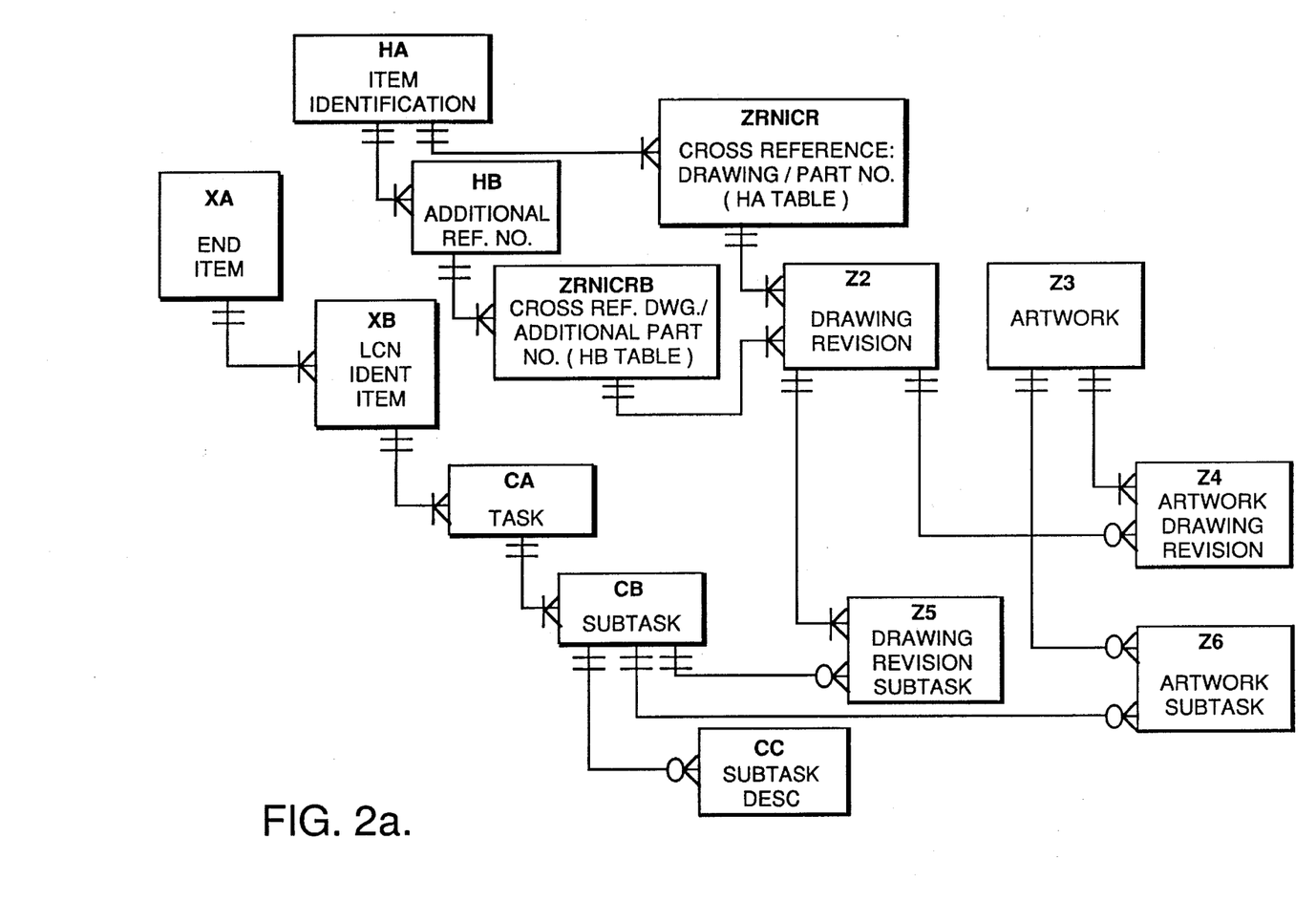
FIG. 2A is a graphical representation of the required relationships between the LSAR and the engineering records.
Figure 2B:
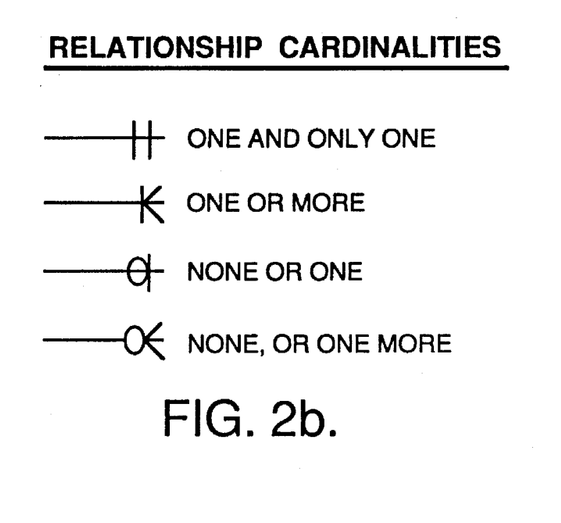
FIG. 2B defines the relationship cardinalities employed in FIG. 2A.

FIG. 2A illustrates the relationship between the LSAR database and the engineering drawings and artwork tables. FIG. 2B shows the relationship cardinalities. The tables not heretofore discussed are described below.

Table XA, End Item Acronym Code (EIAC) Table. This table defines and contains the EIAC used to define the LSAR (Logistic Support Analysis Record) system documented in the relational database. An example of this could be 'AMRAAM-MSL' indicating that this EIAC is the AMRAAM (Advanced Medium Range Air to Air Missile) Missile.

Table XB, Logistic Support Analysis (LSA) Control Number Indentured Item. This table contains all LCN's (LSA Control Number) and information about the indentured location of the LCN in the hardware/functional configuration of system/equipment. An entry in this table could not exist without first an entry in Table XA.

Table CA, Task Requirement. This table contains task level information required for documentation of task analysis and personnel and support requirement data such as Mean Elapsed Time, Time Frequency, Task Criticality, Task Identification, and Task Code. An entry in this table could not exist without first an entry in Table XB.

Table CB, Subtask Requirement. This table contains data related to the subtask level such as Work Area Code and Mean Minute Elapsed Time. An entry in this table could not exist without first an entry in Table CA.

Table CC, Sequential Subtask Description. This table contains the sequential task narrative entered at the subtask level. The narrative will be entered in a step-by-step basis in order to document all subtasks required to perform the task under analysis. Subtasks should be detailed and sequenced to eliminate possibilities of technically incorrect procedures. An entry in this table could not exist without first an entry in Table CB.

Table HA, Item Identification. This table contains parts information that is not dependent of the part application such as item identification, cataloging, common maintenance information, special management characteristics and units of measure and issue.

Table HB, Additional Reference Number. This table contains Additional Reference Numbers that may be used to identify the item of supply.

Table Z2, Drawing Revision Table. This table contains the engineering drawing and drawing revision number. This is a standalone table, in other words no other information is required in any other table within the LSAR database.

Table Z3, Artwork Table. This table contains the artwork identification. This table is a standalone table, in other words no other information is required in any other table within the LSAR database.

Table Z4, Artwork Drawing Revision Cross Reference Table. This table contains a cross reference of Artwork to Engineering Drawing or vice-versa. An entry in this table could not exist without first an entry in both Table Z2 and Table Z3.

Table Z5, Drawing Revision Subtask Cross Reference Table. This table contains a cross reference of Drawing Revision to Subtask. An entry in this table could not exist without first an entry in both Table CB and Table Z2.

Table Z6, Artwork Subtask Cross Reference Table. This table contains a cross reference of Artwork to Subtask. An entry in this table could not exist without first an entry in both Table CB and Table Z3.

Table ZRNICR provides a cross reference between the drawing and the part number stored in the HA Table of the LSAR database.

Table ZRNICRB provides a cross reference between the drawing and the additional part number stored in the HB Table of the LSAR database.

Figure 3:
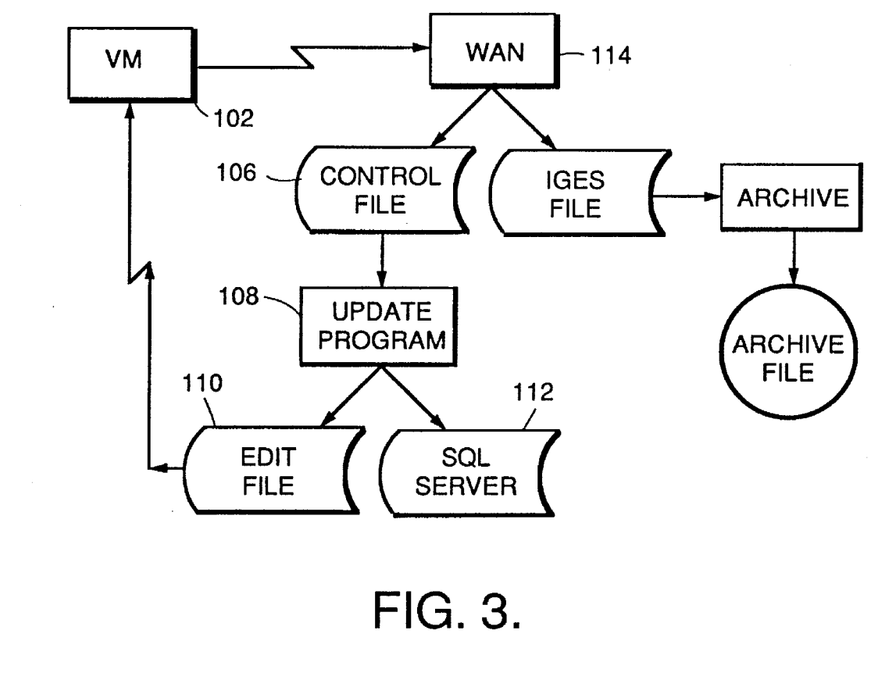
FIG. 3 is a flow diagram of aspects of the process of FIG. 1.

FIG. 3 illustrates the IGES file transmission process in further detail. This figure illustrates the steps performed in the CAD computer environment, which typically uses the "Virtual Machine" (VM) operating system, and the LSAR 1388 database environment, which uses the "Wide Area Network" (WAN) operating system. The VM operating system is well known, and is in widespread use as a platform for CAD systems. An example is the "CADAM" system marketed by IBM. The WAN environment is supported by Novell 3.1, and runs on personal computers. First, at step 102, on the CAD VM environment, the CALS-format file, e.g., an IGES file, is created of either the engineering drawing or publication artwork. The control file is also created during this step. Table II shows the control file layout. Both the IGES file and the control file are transmitted to the LSAR WAN environment (steps 106 and 114).

TABLE II

| CONTROL FILE LAYOUT | | |
|---|---|---|
| Record #1 | GROUP ID | Char (4) |
| Record #2 | RSE ID | Char (8) |
| Record #3 | EIACOD | Char (10) |
| Record #4 | LSACON | Char (18) |
| Record #5 | ALTLCN | Number (4) |
| Record #6 | LCNTYP | Char (1) |
| Record #7 | TASKCD | Char (7) |
| Record #8 | SUBNUM | Number (3) |
| Record #9 | IGES ID | Char (40) |
| Record #10 | ARTWORK NAME | Char (40) |
| Record #11 to #n: | DRAWING ID (1–20) | Char (16) |
| | DRAWING REVISION ID (21–23) | Char (3) |

The data set name of the IGES file on MVS will be automatically created (step 104) in the format of xxx-.yyy.iges-id as follows:

xxx=constant of 'aaaaaaaa'.

yyy=constant of 'bbbbbbbb'.

iges-id=dddddddd.eeeeeeee.ffffffff.

A program on WAN will read the control file (step 106), and update the program (step 108) by performing the following functions (steps 110 and 112).

a. Update the drawing Revision/Subtask Table Z5. Each drawing revision will be combined with the subtask identification to create an entry in Table Z5. If the subtask identification is not present in the LSAR-2B database, the processing will terminate, and an Edit File will be created with the appropriate error messages.

b. Update the IGES/Drawing Revision Table Z6. If the IGES identification is not present in the LSAR-2B database, the processing will terminate, and an Edit File will be created with the appropriate error messages. Each drawing revision will be combined with the IGES identification to create an entry in Table Z6.

c. Create an Edit File. After the LSAR-2B database update has been successfully concluded, an Edit File will be created with a message stating that the processing has successfully terminated. The Control File records are also sent back to the originator to verify transmission. The Edit File is transmitted to the VM environment to provide feedback to the originator of the IGES transfer.

Figure 4A:
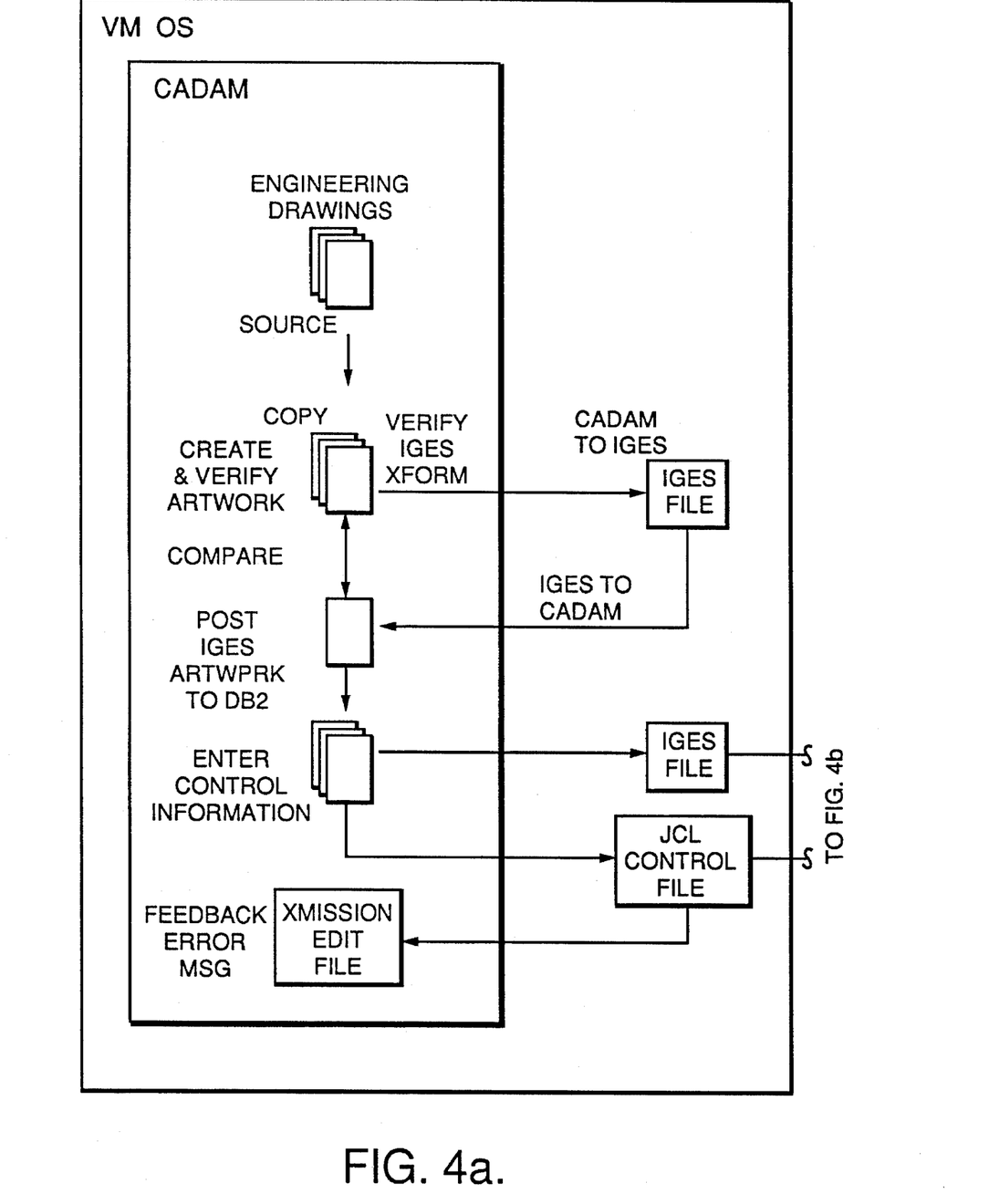
FIG. 4 is a simplified flow diagram illustrating the respective operations performed by the process of FIG. 1 in the VM operating system environment and the WAN operating system environment.
Figure 4B:
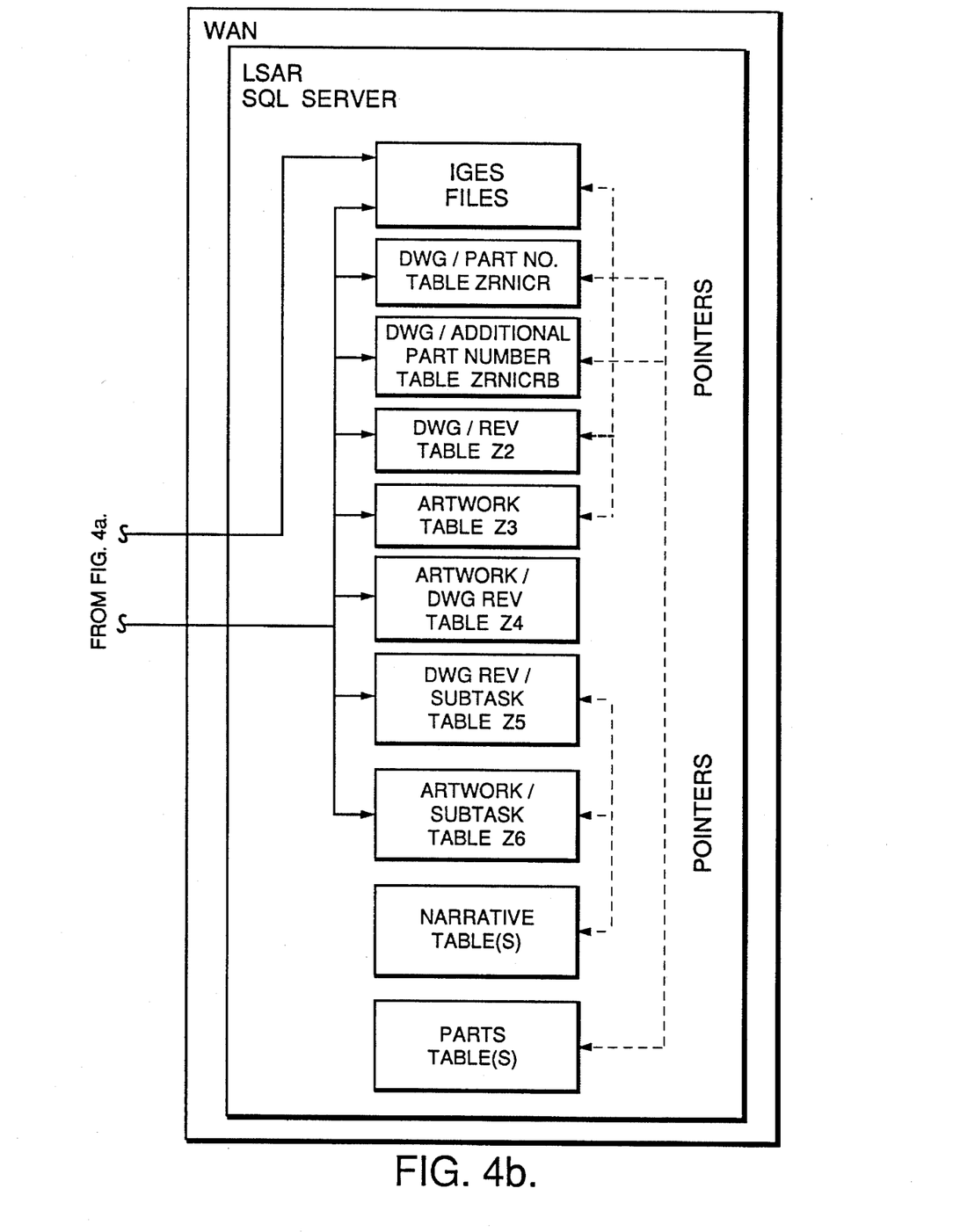

FIG. 4 is a simplified flow diagram which depicts the respective operations of the process of FIG. 1 performed in the VM operating system environment and in the WAN operating system environment, respectively. The artwork and engineering drawing images, once converted to the individual digital data graphics files whose formats are specified by the requirements of the LSAR database, are transferred to the WAN environment of the LSAR database. In the preferred embodiment, the contents of these files are then transferred to the Z2 or Z3 tables, depending on whether the file contains an engineering drawing or artwork, and the individual graphics files are deleted. In this implementation, all the engineering drawings are stored in table Z2, and all the artwork is stored in table Z3, taking full benefit of the relational power of the LSAR database. Alternatively, instead of transferring contents of the individual graphics files to the Z2 and Z3 tables, the individual graphics files can be maintained. The pointer information must then point to the individual files, rather than specific entries in the tables. Both implementations are indicated in FIG. 4, with the phantom lines in the WAN environment leading between the IGES files and the Z2 and Z3 tables indicated flow of data from the IGES files to the respective tables in the preferred embodiment; in the alternate embodiment, there is no data flow from the IGES files to the tables Z2 and Z3.

The process of the present invention permits Logistics Support Analysis (LSA) functions to be performed in less time, for less cost, and with fewer errors. The scope of the LSA process is broadened by adding engineering drawings and engineering relationships to the pre-existing LSAR database. Engineering personnel can utilize the Ad-Hoc query capabilities of the relational database program product to relate specific hardware to its maintenance procedures, special tool requirements, special handling requirements and the like within the LSAR database. The process also enhances configuration management by relating, in the LSAR, source engineering to publications art, engineering to task/subtask, and the like. Configuration management is a discipline for organizing and controlling the planning, design, development, production operations, change control, accounting and auditing. Configuration management assures that the item versions managed by the Data Control function are properly utilized and authorized, ie. that the correct versions are used at the correct time, to meet contractual and business needs. These relationships facilitate automated change notification procedures, for example, notification of an impending change to a publication illustration as a result of a change to a source engineering drawing.

The invention can be utilized for LSAR task reviews by comparing the task narrative to the drawing ensuring that the task narrative covers all aspects of the part. Another use is in provisioning reviews. Another use is to permit the automated publication of technical manuals, in the manner described in commonly assigned, co-pending application 07/788,906, filed Nov. 7, 1991, attorney docket 91172, "Automated Generation of Technical Publications," by K. W. Virgil et al., to include the artwork and engineering.

It is understood that the above-described embodiments are merely illustrative of the possible specific embodiments which may represent principles of the present invention. Other arrangements may readily be devised in accordance with these principles by those skilled in the art without departing from the scope and spirit of the invention.

APPENDIX I

| | | | |
|---|---|---|---|
| Z001 | Drawing Number | | 32XL |
| | The released engineering drawing number. | | |
| Z002 | Drawing Sheet Number | | 2NL |
| | The release engineering drawing sheet number. | | |
| Z003 | Drawing Number Revision | | 2AL |
| | The release engineering drawing revision number. | | |
| Z004 | Drawing Type | | 1AF |
| | A code which defines the type of drawing. | | |
| | Assembly Drawing | A | |
| | Master Drawing (Artwork) | B | |
| | Schematic | C | |
| | Mechanical | D | |
| Z005 | Drawing Image | | Variable Length |
| | The CCITT Gp 4 image tile. | | |
| Z006 | Drawing Sheet Size | | 1AF |

APPENDIX I -continued

| | | | |
|---|---|---|---|
| | A code indicating the size sheet used by the released engineering drawing. Sheet Size must be one of the following: | | |
| | Sheet Size | Sheet Size Code | |
| | 8.5 × 11 | A | |
| | 11 × 17 | B | |
| | 22 × 17 | C | |
| | 22 × 34 | D | |
| | 34 × 44 | E | |
| | 34 × 132 | J | |
| Z007 | Drawing Sheet Tile Number | | 2NF |
| | The number of tiles making up the released engineering drawing, plus one for the overview. | | |
| | Sheet Size | Number of Tiles | |
| | A | 2 | |
| | B | 5 | |
| | C | 5 | |
| | D | 9 | |
| | E | 17 | |
| | J | 49 | |
| Z008 | Artwork Identification | | 40XL |
| | This is a unique identifier of the artwork. | | |
| Z009 | Artwork Type Code | | 8XL |
| | The type of image format the artwork is stored in. Following is a list, not to be construed as all inclusive, of the more common image formats and the appropriate code based upon the DOD's CALS initiatives. | | |
| Z010 | Artwork Name | | 40XL |
| | The name of the artwork. This is the name that will be used to refer to the artwork in a technical manual. | | |
| Z011 | Artwork Image | | Variable Length |
| | The digital image of the artwork. | | |
| Z012 | Artwork Sequence Code | | 3NR |
| | The sequence or order in which the artwork is associated with the narrative located in Table UF. | | |

What is claimed is:

1. A method for storing engineering drawings and artwork in a logistical relational database for subsequent retrieval and use, the logistical relational database holding data regarding hardware items and one or more work tasks involving the operation or maintenance of the hardware items, the method comprising the following steps:

creating one or more engineering drawings of a given hardware item on a computer aided design (CAD) system, and storing said one or more engineering drawings in CAD system memory in a drawing CAD file, wherein said CAD system memory and said drawing CAD file is not accessible to said relational database;

using said stored one or more engineering drawings to prepare artwork regarding said given hardware item on said CAD system and storing said artwork in CAD system memory in an artwork CAD file, wherein said artwork CAD file is not accessible to said relational database;

transforming said drawing CAD file and said artwork CAD file into a digital data graphics drawing file and a digital data graphics artwork file, wherein a format of said digital data graphics drawing and artwork files is specified by requirements of said relational database;

providing access to said logistical relational database;

transferring into one or more tables comprising said relational database digital data representing an image of said one ore more engineering drawings of said given hardware item, said digital data comprising said digital data graphics drawing file, and digital data representing an image of said artwork and comprising said digital data graphics artwork file;

preparing control files specifying control data regarding said stored one or more engineering drawings and said artwork to be added to files comprising said relational database; and adding said control data to pointer tables comprising said database, said control data specifying a relationship between said artwork and a corresponding engineering drawing, a relationship between said artwork and a corresponding task or subtask, and a relationship between said engineering drawing and a corresponding task or subtask.

2. The method of claim 1 wherein said pointer tables comprises a pointer table containing data defining images of said engineering drawing, wherein said data from said engineering drawing graphics file is transferred to said pointer table.

3. The method of claim 1 wherein said pointer tables comprise a pointer table containing data providing a cross-reference between engineering drawing numbers and part numbers associated with said hardware item.

4. The method of claim 1 wherein said pointer tables comprise a pointer table containing data defining said artwork images.

5. The method of claim 1 wherein said pointer tables comprise a pointer table comprising data providing a cross-reference between said artwork and corresponding engineering drawings.

6. The method of claim 1 wherein said pointer tables comprise a pointer table comprising data providing a cross-reference between engineering drawings and corresponding subtasks regarding said hardware item.

7. The method of claim 1 wherein said pointer tables comprise a pointer table comprising data providing a cross-reference between artwork and corresponding subtasks regarding said hardware item.

8. The method of claim 1 wherein said relational database complies with MIL-STD-1388-2B.

9. A method for storing engineering drawings and artwork in a logistical relational database for subsequent retrieval and use, the logistical relational database holding data regarding hardware items and one ore more work tasks involving the operation of maintenance of the hardware items, the method comprising the following steps:

creating one or more engineering drawings of a given hardware item on a computer aided design (CAD) system, and storing said one or more engineering drawings in CAD system memory in a drawing CAD file, wherein said CAD system memory and said drawing CAD file is not accessible to said relational database;

using said stored one or more engineering drawings to prepare artwork regarding said given hardware item on said CAD system and storing said artwork in CAD system memory in an artwork CAD file, wherein said artwork CAD file is not accessible to said relational database;

transforming said drawing CAD file and said artwork CAD file into a digital data graphics drawing file and a digital data graphics artwork file, wherein a format of said digital data graphics drawing and artwork files is specified by requirements of said relational database;

providing access to said logitical relational database;

transferring said graphics drawing file and said digital data graphics artwork file to said relational database, and populating respective engineering drawing and artwork tables with digital data defining images of said respective engineering drawing and said artwork;

preparing control files specifying control data regarding said stored one or more engineering drawings and said artwork to be added to files comprising said relational database; and adding said control data to pointer tables comprising said database, said control data specifying a relationship between said artwork and a corresponding engineering drawing, a relationship between said artwork and a corresponding task or subtask, and a relationship between said engineering drawing and a corresponding task or subtask.

10. A method for storing engineering drawings and artwork in a logistical relational database for subsequent retrieval and use, the logistical relational database holding data regarding hardware items and one or more work tasks involving the operation or maintenance of the hardware items, the method comprising the following steps:

creating one or more engineering drawings of a given hardware item on a computer aided design (CAD) system, and storing said one or more engineering drawings in CAD system memory in a drawing CAD file, wherein said CAD system memory and said drawing CAD file is not accessible to said relational database;

transforming said drawing CAD file into a digital data graphics drawing file, wherein a format of said digital data graphics drawing file is specified by requirements of said relational database;

providing access to said logistical relational database;

transferring into one or more tables comprising said relational database digital data representing an image of said one or more engineering drawings of said given hardware item, said digital data comprising said digital data graphics drawing file;

preparing control files specifying control data regarding said stored one or more engineering drawings to be added to files comprising said relational database; and adding said control data to pointer tables comprising said database, said control data specifying a relationship between said engineering drawing and a corresponding task or subtask.

11. A method for storing engineering drawings and artwork in a logistical relational database for subsequent retrieval and use, the logistical relational database holding data regarding hardware items and one or more work tasks involving the operation or maintenance of the hardware items, the method comprising the following steps:

creating one or more engineering drawings of a given hardware item on a computer aided design (CAD) system, and storing said one or more engineering drawings in CAD system memory in a drawing CAD file, wherein said CAD system memory and said drawing CAD file is not accessible to said relational database;

using said stored one or more engineering drawings to prepare artwork regarding said given hardware item on said CAD system and storing said artwork in CAD system memory in an artwork CAD file, wherein said artwork CAD file is not accessible to said relational database;

transforming said drawing CAD file and said artwork CAD file into a digital data graphics drawing file and a digital data graphics artwork file, wherein a format of said digital data graphics drawing and artwork files is specified by requirements of said relational database;

providing access to said logistical relational database;

transferring into one or more tables comprising said relational database digital data representing an image of said one or more engineering drawings of said given hardware item, said digital data comprising said digital data graphics drawing file, and digital data representing an image of said artwork and comprising said digital data graphics artwork file;

preparing control files specifying control data regarding said stored one or more engineering drawings and said artwork to be added to files comprising said relational database; and adding said control data to pointer tables comprising said database, said control data specifying a relationship between said artwork and a corresponding task or subtask, and a relationship between said engineering drawing and a corresponding task or subtask.

* * * * *